(12) United States Patent
Miller

(10) Patent No.: US 6,364,358 B1
(45) Date of Patent: Apr. 2, 2002

(54) SIDE SILL LOAD PATH INITIATOR

(75) Inventor: Ryan Miller, Columbus, OH (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/532,843

(22) Filed: Mar. 21, 2000

(51) Int. Cl.⁷ .............................................. B62D 21/10
(52) U.S. Cl. ...................... 280/784; 280/847; 280/848; 296/188; 296/209
(58) Field of Search ................................ 280/784, 847, 280/848, 781; 296/188, 209

(56) References Cited

U.S. PATENT DOCUMENTS

| | | | |
|---|---|---|---|
| 3,881,742 A | | 5/1975 | Felzer |
| 4,183,574 A | * | 1/1980 | Klie et al. .................. 296/188 |
| 4,346,930 A | * | 8/1982 | Northey ...................... 296/107 |
| 4,378,120 A | | 3/1983 | Laine |
| 4,679,820 A | * | 7/1987 | Srock et al. ................. 280/781 |
| 4,723,811 A | * | 2/1988 | Harasaki .................... 296/194 |
| 4,950,025 A | * | 8/1990 | Yoshii ........................ 296/195 |
| 5,042,872 A | * | 8/1991 | Yoshii ........................ 296/203 |
| 5,275,436 A | | 1/1994 | Pomero |
| 5,303,973 A | * | 4/1994 | Fujii .......................... 296/194 |
| 5,348,113 A | | 9/1994 | Drvota et al. |
| 5,462,324 A | | 10/1995 | Bowen et al. |
| 5,472,063 A | * | 12/1995 | Watanabe et al. ........... 180/274 |
| 5,492,193 A | * | 2/1996 | Guertler et al. ............. 180/232 |
| 5,641,194 A | | 6/1997 | Honma et al. |
| 5,653,495 A | | 8/1997 | Bovellan et al. |
| 5,685,599 A | * | 11/1997 | Kitagawa .................... 296/204 |
| 5,782,525 A | * | 7/1998 | Honma et al. .............. 296/188 |
| 5,823,553 A | | 10/1998 | Thompson |
| 5,882,065 A | * | 3/1999 | Koiwa et al. ........... 296/203.02 |
| 6,196,621 B1 | * | 3/2001 | VanAssche et al. ......... 296/188 |
| 6,286,867 B1 | * | 9/2001 | Braemig et al. ............ 280/784 |

FOREIGN PATENT DOCUMENTS

| | | | | |
|---|---|---|---|---|
| JP | 02212280 A | * | 8/1990 | ................. 296/209 |
| JP | 04215570 A | * | 8/1992 | ............... 296/203.1 |
| JP | 04215574 A | * | 8/1992 | ................. 296/209 |

* cited by examiner

Primary Examiner—Paul N. Dickson
Assistant Examiner—Deanna Draper
(74) Attorney, Agent, or Firm—Rankin, Hill, Porter & Clark LLP

(57) ABSTRACT

A bracket for preventing deflection of a wheel under a side sill of a motor vehicle during an offset collision. The bracket includes a substantially vertical plate attached to a forward portion of the side sill of the motor vehicle. The vertical plate extends below a bottom edge of the side sill. A brace is connected between the side sill and the plate.

18 Claims, 2 Drawing Sheets

SIDE SILL LOAD PATH INITIATOR

BACKGROUND OF THE INVENTION

1. Field of the Invention

The present invention generally pertains to automobile frames and, more particularly, toward a device for directing crash loads toward a side sill of an automobile frame.

2. Description of Related Art

Sport utility vehicles have a frame that includes forward A-pillars, a plurality of transverse beam members, and a pair of lateral or side sills. The A-pillars extend downwardly from the roof between the front windshield and the front passenger door openings. A lower end of each A-pillar is welded to, or formed with, the forward end of the associated side sill. Due to the high ride-height, there is a tendency for the front tires, especially during certain front offset collisions, to be forced under the vehicle. During particularly violent and directed impacts, the front wheel may be forced under the vehicle and upwardly into the passenger compartment. Hence, there is a need for an improved structure for stopping the wheel at the A-pillar and thereby preventing penetration of wheel into the passenger compartment.

Since there is no means for transferring the load toward the side sill, the crash load must be borne by the other portions of the forward frame. However, the side sill is better able to bear the load, or at least part of the load, than other portions of the automobile frame. Therefore, there is a need for a device that facilitates transfer of crash loads to the side sill.

At least some of the foregoing problems have been recognized, but most of the prior efforts have focused on trying to control the path of the wheel within the wheel well or wheel housing during a crash. For example, U.S. Pat. No. 3,881,742 discloses a motor vehicle having an energy absorbing structure that includes deflector elements. During a crash, the deflector elements deflect the front wheels outwardly as the front end of the automobile collapses rearwardly. U.S. Pat. No. 5,275,436 discloses a similar deflecting structure, wherein an inside surface of the wheel wells is shaped so as to deflect the wheels during offset collisions.

There exists a need in the art for a structure that will better distribute the load of front offset crashes. There further exists a need in the art for a device that will prevent, or reduce the likelihood of, a front tire being forced under the automobile during a front offset collision. There further exists a need in the art for a device for transferring crash loads to the side sill.

SUMMARY OF THE INVENTION

The present invention is directed toward a structure to distribute the load of front offset impacts so that at least a portion of the crash load is distributed to the side sill of the automobile frame. The present invention is further directed toward a device that prevents or minimizes the possibility of a front tire being forced under the automobile during a front offset collision.

In accordance with the present invention, a bracket for preventing deflection of a wheel under a side sill of an automobile during an offset collision includes a vertical plate and a brace. The vertical plate is attached to a forward portion of the side sill and extends below a bottom edge of the side sill. The plate essentially forms an extension of the side sill, and downwardly and laterally extends the forward-facing profile of the side sill.

In further accordance with the present invention, the brace is connected to the side sill. The brace is substantially L-shaped, and includes a substantially vertical member attached to the vertical plate and a substantially horizontal member attached to the side sill. The horizontal member of the brace preferably runs parallel to the side sill.

In further accordance with the present invention, a bracket is provided for preventing deflection of the wheel from the wheel well under a side sill of the automobile during a front offset collision. The bracket is also provided for transferring the wheel crash load to the side sill. The bracket includes a substantially vertical plate attached to a forward portion of the side sill. The vertical plate extends downwardly below a bottom edge of the side sill and laterally outboard of the side sill.

The vertical plate includes a structural member for absorbing contact with the wheel and a flange for connecting the structural member to the side sill. The flange is preferably shaped to form a tight fit with the side sill. The bracket also includes a brace that is connected to the side sill. The brace is substantially L-shaped and has a substantially vertical member attached to the vertical plate and a substantially horizontal member attached to the side sill.

The vertical plate is advantageously located in a position to receive the wheel during a front offset collision and thereby prevents the wheel from passing under the side sill and, thus, under the automobile. The plate limits the movement of the wheel and, via the brace, serves to transfer loads from the wheel to the side sill.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 1:
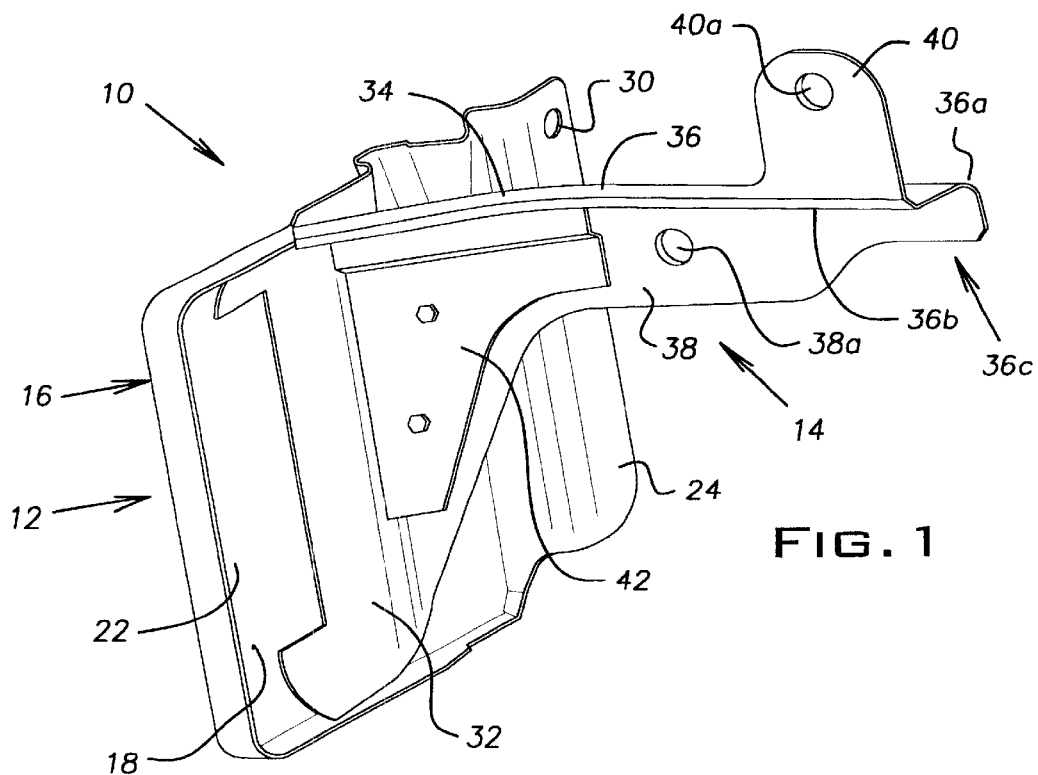
FIG. 1 is a side and rear perspective view a bracket according to the present invention.

With reference to the drawing figures, a bracket 10 of the present invention is illustrated both alone and in its intended operating position secured to a side sill 11 of an automobile frame. In the following description, the present invention is illustrated and described as a separate part that is attached to form an extension, both lateral and vertical, of the side sill. However, it is contemplated that the bracket, under certain circumstances, could be integrally formed with the side sill. It is further contemplate that the bracket will be shaped to match the configuration of the automobile side sill without departing from the scope and spirit of the present invention.

With reference to FIG. 1, the bracket 10 according to the present invention includes a plate 12 and a brace 14. The plate 12, when installed, is generally vertical and includes a forward face 16 and a rearward face 18. The forward face 16 is directed toward the wheel 20 and is available to for engagement with the wheel should a crash occur. The rearward face 18 of the plate 12 has the brace 14 attached thereto and extending rearwardly therefrom. The plate 12 and brace 14 are preferably formed as separate pieces and subsequently attached to one another by welding or other conventional means. Alternatively, the plate and brace may be formed from a single piece of metal by known metal forming techniques.

The plate 12 includes a first lateral portion 22 and a second lateral portion 24. The first lateral portion or structural member 22 is generally planar, and extends laterally and vertically from the forward profile of the associated side sill 11. Accordingly, the first lateral portion 22 defines an operative extension of the side sill 11 in the vertical and horizontal directions, as illustrated. The first lateral portion 22 will extend or project from the automobile and be readily visible.

The second lateral portion or flange 24 will extend inboard of the automobile and generally be concealed within the wheel well 26. The second lateral portion or flange 24 is preferably contoured to match the shape or configuration of the forward end 28 of the side sill 11 so as to form a tight fit therewith, as will be apparent from the following description. The second lateral portion 24 includes one or more openings 30 through which a mounting screw (not shown) may be inserted to help secure the bracket 10 to the automobile.

The rearward face 18 of the plate 12, which engages the side sill, has the brace 14 secured thereto and extending rearwardly therefrom. The brace 14 is secured near the intersection of the first lateral portion 22 and the second lateral portion 24 of the plate 12. The brace 14 is generally L-shaped, having a vertically-directed first leg or member 32 and a horizontally-directed second leg or member 34. The first leg 32 is attached to the rearward face 18 of the plate 12, preferably by welding. The second leg 34 includes an upper, horizontal portion 36, a lower, vertical portion 38, and an upstanding tab 40.

The horizontal and vertical portions 36, 38 of the second leg 34 are integrally formed, and designed to extend along corresponding surfaces of the side sill 11 and form a tight fit therewith, as illustrated. The horizontal portion 36 has first and second opposed edges 36a, 36b. The vertical portion 38 extends downwardly from the first edge 36a and the tab extends upwardly from the second edge 36b.

The vertical portion 38 extends virtually the entire length of the horizontal portion 36, and merges or connects with the first, vertical leg 32. The upstanding tab 40 is comparatively shorter in length, and is disposed substantially only at a distal end 36c of the horizontal portion 36 that is remote from the first, vertical portion 38. Both the vertical portion 38 and the upstanding tab 40 provide openings 38a, 40a to permit releasably securing the brace 14 to the side sill 11 with bolts or the like (not shown).

A secondary bracket or bracing member 42 is preferably provided at a location generally defined by the intersection of the first leg 32 and the second leg 34, as illustrated. The secondary bracket 42 may, in some applications, not be necessary, and may therefore be considered optional.

Figure 2:
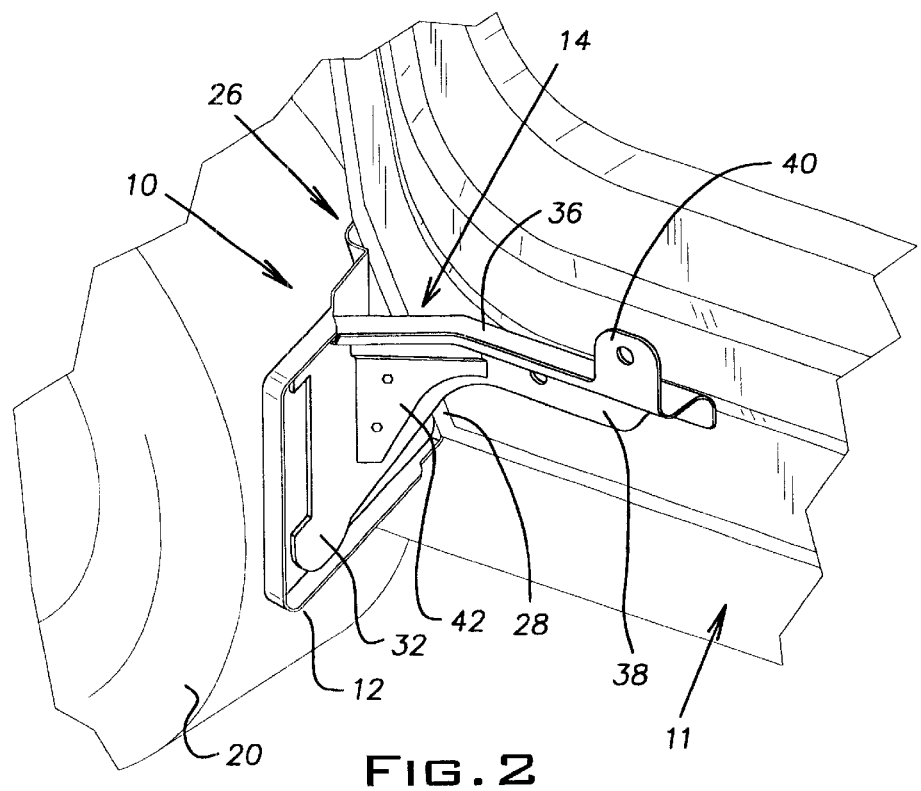
FIG. 2 is a partial perspective view of the inventive bracket secured to the side sill of the automobile.
Figure 3:
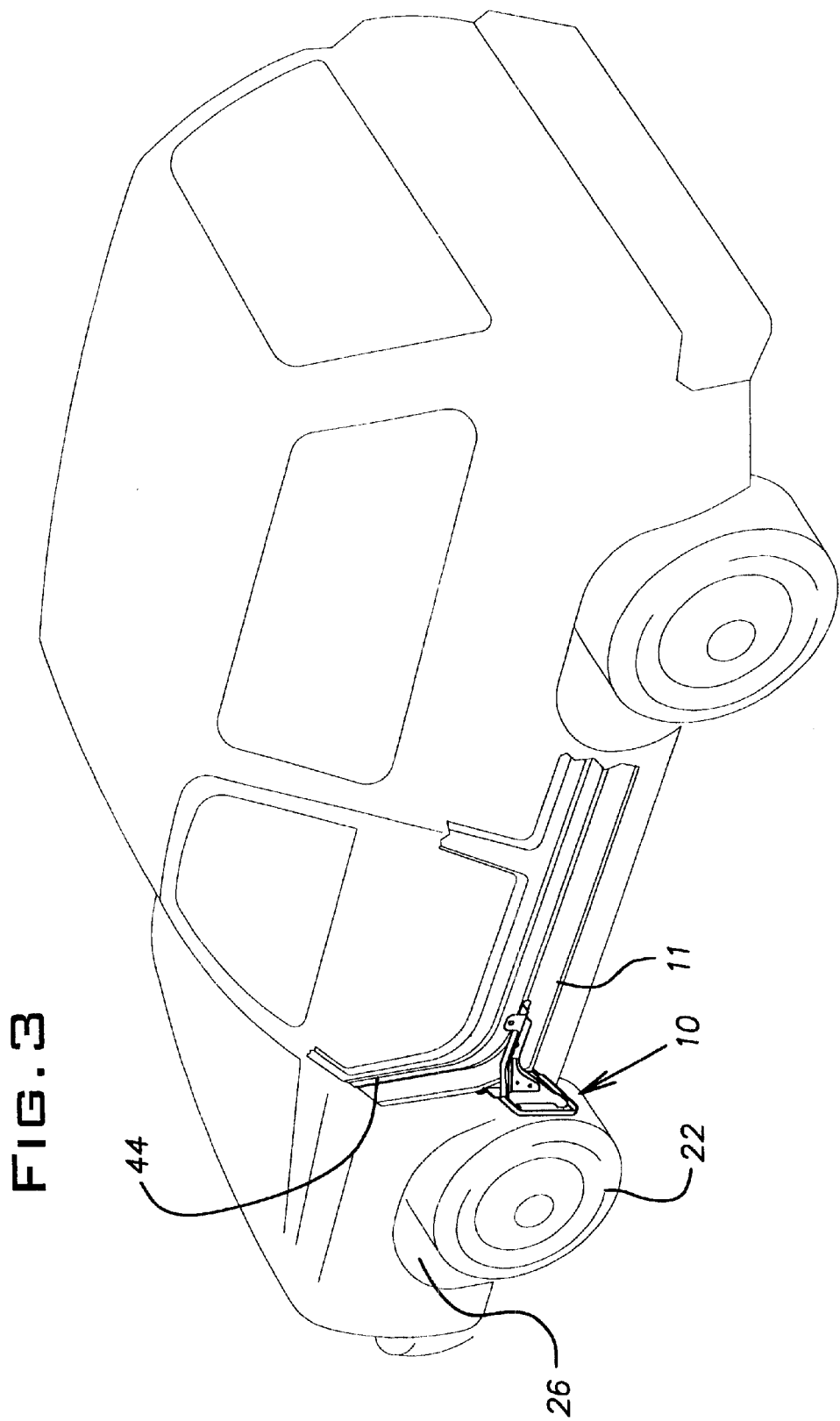
FIG. 3 schematically illustrates an automobile incorporating the bracket according to the present invention.

With specific reference to FIGS. 2 and 3, the bracket 12 according to the present invention is shown in its operating position secured to an automobile preferably at a location behind the front wheel 20. The A-pillar 44 of the automobile merges with the side sill 11 at the location that the bracket 10 is mounted. The generally planar first lateral portion 22 of the plate 12 extends laterally and downwardly from the side sill 11, while the contoured second lateral portion 24 of the plate forms a tight fit with the forward end 28 of the side sill 11. The second lateral portion or flange of the plate is secured over the forward face of the side sill 11.

The brace 14 extends rearwardly along the lateral or outwardly-directed surface 11a of the side sill 11. The side sill has a stepped profile that matches the configuration of the brace such that the brace 14 is in face-to-face contact with the side sill 11 along at least two surfaces, as illustrated. Conventional fasteners may be used to secure the brace to the side sill. Alternatively, the bracket may be welded in place, if desired.

During a front offset collision, the wheel 20 on the vehicle may be driven toward the underside of the automobile. With the bracket 10 according to the present invention, the forward face 16 of the plate 12 will be engaged by the wheel 20 and prevent the wheel from being deflected downwardly and under the automobile. Typically, the wheel will be stopped at the A-pillar 44, and the force or load on the plate 12 is efficiently transferred to the subjacent side sill 11.

It is noted that the bracket according to the present invention is in a location that has been traditionally occupied by a flexible rubber piece that serves as a mud flap or similar device to prevent dirt, rocks, and road debris from being flung by the wheel onto the exterior side surface of the vehicle. In order to maintain that traditional function, the bracket according to the present invention may be incorporated into, or otherwise integrated with, a mudflap. For example, the forward face of the plate may be covered by a flexible elastomeric cover. Alternatively, either the plate alone, or the entire bracket, may be encased in a flexible elastomeric material. It is considered apparent that numerous methods and devices for attaching a flexible mud flap or cover to the bracket of the present invention without departing from the scope and spirit of the present invention.

While the preferred embodiment of the present invention is shown and described herein, it is to be understood that the same is not so limited but shall cover and include any and all modifications thereof which fall within the purview of the invention.

What is claimed is:

1. A bracket for preventing deflection of a wheel under a side sill of a motor vehicle during an offset collision, comprising;
    a substantially vertical plate attached to a forward portion of said side sill of the motor vehicle, said vertical plate extending below a bottom edge of said side sill; and
    a brace, said brace being connected to said side sill.

2. The bracket of claim 1, wherein said vertical plate is contained within a mud flap connected to said motor vehicle.

3. The bracket of claim 1, wherein said vertical plate is transverse to said side sill.

4. The bracket of claim 1, wherein said brace is substantially L-shaped, said brace comprising:
    a substantially vertical member attached to said vertical plate; and
    a substantially horizontal member attached to said side sill.

5. The bracket of claim 4 wherein said horizontal member of said brace runs parallel with said side sill.

6. The bracket of claim 5 wherein said horizontal member of said brace is shaped to form a tight fit with said side sill.

7. The bracket of claim 4 further comprising:
    a secondary bracket providing support for said brace at a point where said vertical member and said horizontal intersect.

8. The bracket of claim 1 wherein said vertical plate comprises:
    a structural member for absorbing contact with said wheel; and
    a flange extending from said structural member for connecting said structural member to said side sill, said flange being shaped to form a tight fit with said side sill.

9. The bracket of claim 1, wherein said vertical plate and said brace form a single piece.

10. The bracket of claim 1, wherein said vertical plate and said brace are separate pieces connected together.

11. A bracket for preventing deflection of a wheel from a wheel housing under a side sill of a motor vehicle during an offset collision and transferring load to said side sill, comprising:

a substantially vertical plate attached to a forward portion of said side sill of the motor vehicle, said vertical plate extending below a bottom edge of said side sill, said vertical plate having a structural member for absorbing contact with said wheel and a flange for connecting said structural member to said side sill, said flange being shaped to form a tight fit with said side sill; and a brace, said brace being connected to said side sill, said brace being substantially L-shaped and having a substantially vertical member attached to said vertical plate and a substantially horizontal member attached to said side sill.

12. The bracket of claim 11 wherein said horizontal member of said brace runs parallel with said side sill.

13. The bracket of claim 11 wherein said horizontal member of said brace is shaped to form a tight fit with said side sill.

14. The bracket of claim 11 further comprising:

a secondary brace providing support for said brace at a point where said vertical member and said horizontal intersect.

15. The bracket of claim 11 wherein said vertical plate and said brace form a single piece.

16. The bracket of claim 11 wherein said vertical plate and said brace are separate pieces connected together.

17. A mud flap for use with a motor vehicle, comprising:

a substantially vertical plate attached to a forward portion of a side sill of said motor vehicle, said vertical plate extending below a bottom edge of said side sill;

a brace, said brace being connected to said side sill and providing support for said vertical plate; and an outer cover covering said vertical plate.

18. A method of transferring a load created by an offset collision of a motor vehicle, said motor vehicle having a wheel and a side sill, said method comprising the steps of:

increasing a cross-sectional area of said sill by attaching a bracket in front of said side sill;

absorbing energy from an offset collision by said wheel contacting said bracket located in front of said side sill;

transferring said load of said collision to said side sill; and, preventing said wheel from deflecting under said side sill.

* * * * *

UNITED STATES PATENT AND TRADEMARK OFFICE
Certificate

Patent No. 6,364,358 B1                                                                             Patented: April 2, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ryan Miller, Columbus, OH; and Duane T. Detwiler, Powell, OH.

Signed and Sealed this Twenty-ninth Day of March 2005.

PAUL N. DICKSON
*Supervisory Patent Examiner*
Art Unit 3616